United States Patent [19]

Canfield

[11] Patent Number: 5,025,496
[45] Date of Patent: Jun. 18, 1991

[54] ODD/EVEN FIELD DETECTOR FOR VIDEO SIGNALS

[75] Inventor: Barth A. Canfield, Indianapolis, Ind.

[73] Assignee: RCA Licensing Corporation, Princeton, N.J.

[21] Appl. No.: 520,205

[22] Filed: May 7, 1990

[51] Int. Cl.[5] .......................................... H04N 5/04
[52] U.S. Cl. .................................... 358/153; 358/148
[58] Field of Search ................. 358/153, 154, 148, 139

[56] References Cited

U.S. PATENT DOCUMENTS

| | | | |
|---|---|---|---|
| 3,485,950 | 12/1969 | Reiser | 358/139 |
| 4,420,775 | 12/1983 | Yamazaki et al. | 360/38.1 |
| 4,608,602 | 8/1986 | Grantham-Hill | 358/154 X |
| 4,683,495 | 7/1987 | Brock | 358/154 X |
| 4,792,853 | 12/1988 | Yamagishi et al. | 358/153 |
| 4,827,341 | 5/1989 | Akimoto et al. | 358/148 |
| 4,858,008 | 8/1989 | Sieben et al. | 358/154 X |
| 4,876,598 | 10/1989 | Carlstedt et al. | 358/160 |

OTHER PUBLICATIONS

National Semiconductor Preliminary Data on "LM1881 Video Sync Separator", Apr. 1986.

Primary Examiner—Victor R. Kostak
Attorney, Agent, or Firm—Joseph S. Tripoli; Eric P. Herrmann; James B. Hayes

[57] ABSTRACT

In a video signal processing system apparatus for differentiating between video field types includes circuitry for measuring an interval between a vertical signal component and a predetermined transition of a horizontal signal component. Measured values from successive fields are compared to provide a signal related to the respective field type, e.g., odd/even.

7 Claims, 2 Drawing Sheets

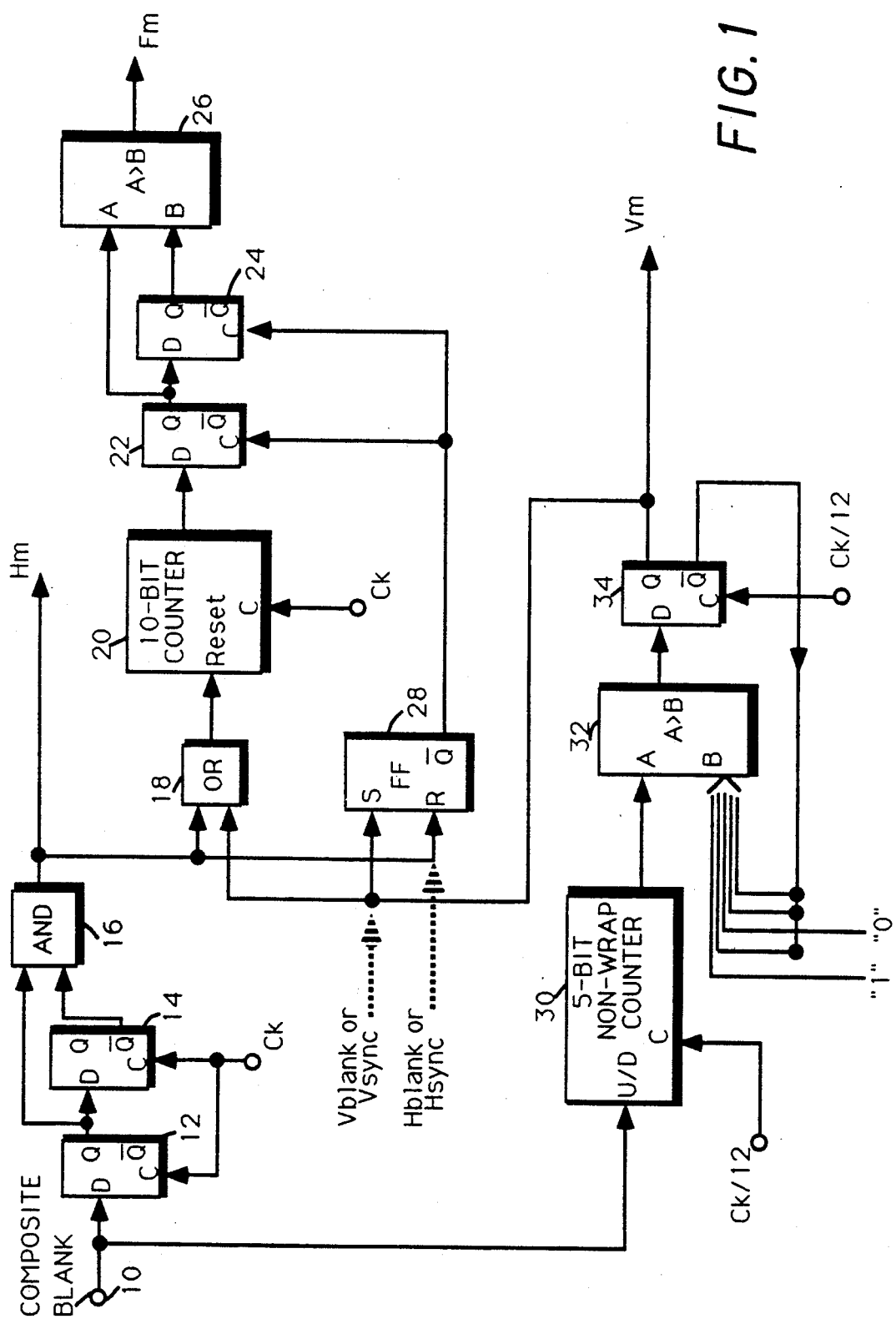

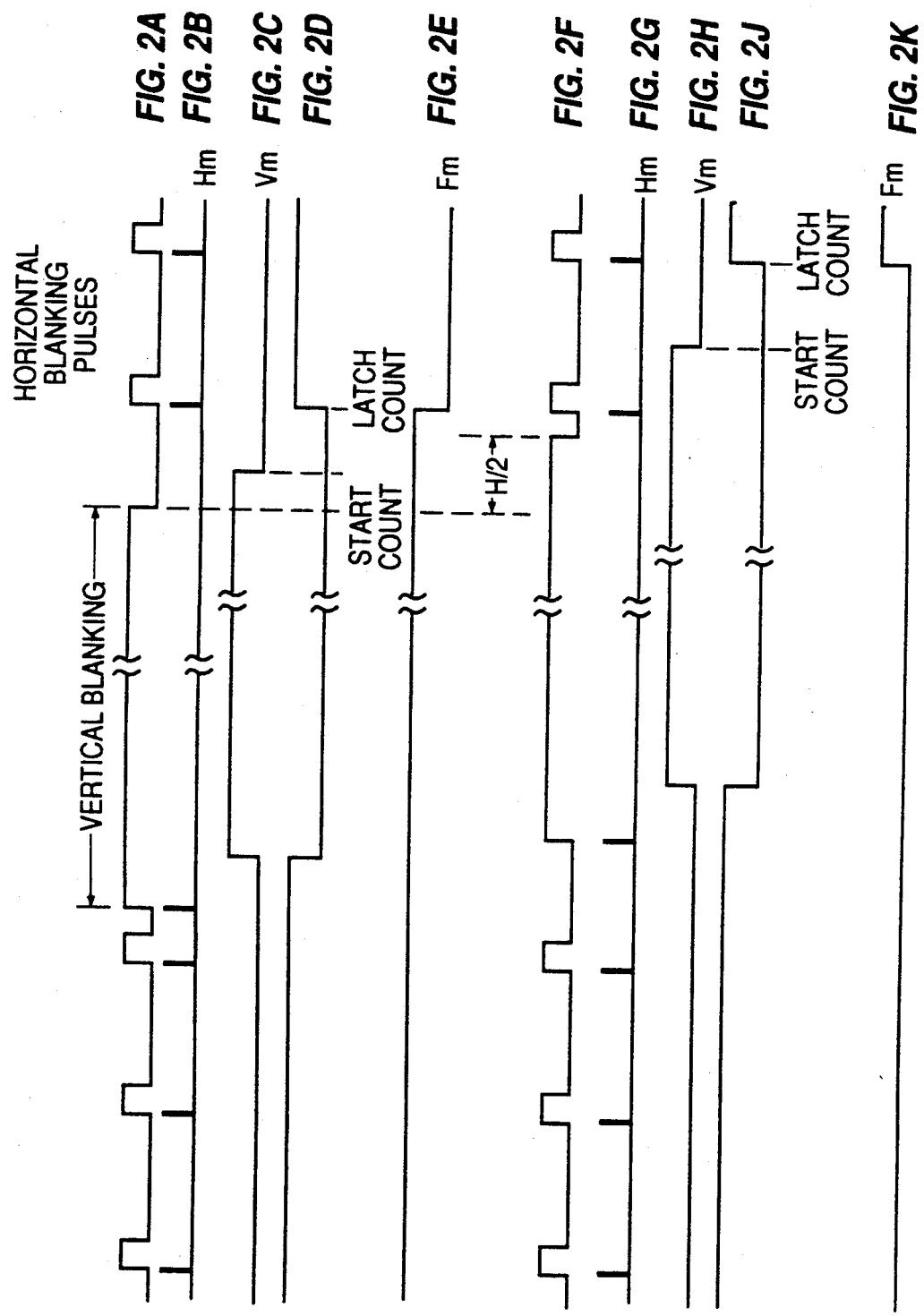

ODD/EVEN FIELD DETECTOR FOR VIDEO SIGNALS

This invention relates to circuitry for detecting odd and even fields of a video signal.

BACKGROUND OF THE INVENTION

Frequently it is desired to differentiate between odd and even fields of a video signal. This is particularly true in systems which generate composite pictures including a small auxiliary image insert within the confines of a larger main image, wherein the two images are unrelated or asynchronous, a so-called picture-in-picture of Pix-in-Pix system. In this type of system odd/even field information of both the main and auxiliary signals is utilized to maintain proper interlacing of the auxiliary signal.

Typical odd/even field detectors, such as are included in the commercially available LM 1881 Video Sync Separator available from National Semiconductor Corporation, integrate the composite synchronizing signal, and sample the integrated signal at predetermined intervals to determine whether the current field is odd or even. Other systems such as is described in U.S. Pat. No. 4,876,598 utilize monostable multivibrators to determine the relative timing of the vertical equalization pulses with respect to the horizontal synchronizing pulses of composite video signal to determine odd and even fields.

The foregoing systems utilize analog signal processing techniques which tend to be adversely affected by parametric changes due to aging, temperature variations, etc. In addition, for example in Pix-in-Pix systems, where it is desired to incorporate the majority of the signal processing of the, e.g., Pix-in-Pix function, on a single integrated circuit in digital form, it is inconvenient to incorporate analog type odd/even field detectors.

SUMMARY OF THE INVENTION

The prevent invention includes an odd/even field detector which is responsive to the vertical and horizontal components of a video signal. Counting means is arranged to count clock pulses in an interval between the end of, for example, a vertical blanking period and the occurrence of, for example a horizontal blanking pulse following the vertical blanking period. Count values provided by the counting means are stored for a field period and compared with the subsequently generated count value to determine whether the current field is an odd or even field.

BRIEF DESCRIPTION OF THE DRAWINGS

FIG. 1 is a block diagram of circuitry for decoding composite blanking signals, including an odd/even field detector embodying the present invention.

FIGS. 2A-AH, 2J 2K are waveform diagrams including composite blanking signals and various signals produced by the FIG. 1 circuitry, useful for understanding the operation of the FIG. 1 apparatus.

DETAILED DESCRIPTION

FIG. 1 illustrates an embodiment of the odd/even field detector as it may be implemented in a Pix-in-Pix system for determining the respective fields of, for example, the main video signal. In this instance field determination is derived from a composite blanking signal provided by the main signal processing circuitry (not shown). The relative timing between the vertical and horizontal blanking intervals of a given video signal may not conform to any standard. However for an interlaced signal the vertical synchronizing (and thus blanking) pulses for consecutive fields must have a one-half horizontal line period timing difference relative to the horizontal synchronizing (blanking pulses.

In a Pix-in-Pix system one may associate odd/even field designation with respective spatial placement within a raster (i.e., line one of odd fields falls spatially above line one of even fields when the signal is applied to a television raster). This type of field distinction is completely dependent upon the selection of line number one within the two consecutive fields.

The primary purpose of Pix-in-Pix systems is to synchronize an auxiliary video signal to be displayed as an inset in a main image (derived from a main video signal) with the main video signal. Nominally this is accomplished by storing the auxiliary video signal in memory synchronously with the auxiliary video signal, and thereafter reading the auxiliary video signal from memory synchronously with the horizontal and vertical timing components of the main video signal. The circuitry of FIG. 1 develops the horizontal and vertical timing pulses Hm and Vm from the main composite blanking signal for use by the Pix-in-Pix system, and also develops a field identification signal Fm for use by the Pix-in-Pix interlace control system. Elements 18–28 of the FIG. 1 circuitry generate the field identification signal Fm from the horizontal and vertical timing signals Hm and Vm.

Referring of FIGS. 1 and 2, FIGS. 2A and 2F illustrate portions of exemplary composite blanking signals for successive even and odd fields respectively. For the illustrated waveforms, even and odd fields are defined according to whether the time (thus spatial) period between the end of vertical blanking and the horizontal blanking pulse representing line number of one of the field is long or short relative to that same measurement made on the previous field.

The composite blanking signal is applied to terminal 10 and coupled to the circuitry including elements 12–16 which generate a horizontal timing signal Hm. Elements 12–16 comprise a positive going transition detector and develop a pulse one clock period wide on the occurrence of each positive going transition of the composite blanking signal as follows. Elements 12 and 14 are D-type latches which are locked by a signal Ck having a frequency of, for example, four times the color subcarrier frequency. A D-type latch provides, at its Q output terminal, the logic value present as its data input terminal D, immediately before the occurrence of a pulse applies to its clock input terminal C. The composite blanking signal is applied to the data input terminal of latch 12, the output terminal, Q, of which is coupled to the data input terminal of latch 14. The Q output terminal of latch 12 and the $\overline{Q}$ output terminal of latch 14 are coupled to respective input terminals an AND circuit 16. The Q output of latch 12 corresponds to the composite blanking signal. The $\overline{Q}$ output of latch 14 corresponds to the composite blanking signal delayed by one clock, Ck, period and inverted in polarity. AND gate 16 provides a logic one output value when the Q output of latch 12 and the $\overline{Q}$ output of latch 14 are both logic one values, which only occurs for one clock period immediately following a positive transition of the composite video signal. The output signal Hm provided by the AND gate 16 is illustrated in FIGS. 2B AND 2G.

The composite blanking signal is also coupled to the circuitry including elements 30–34 which generates the vertical timing signal Vm. The signal Vm is normally low valued and goes high a predetermined interval after the positive transition of the vertical component of the blanking signal and then goes low subsequent the end of the vertical blanking interval.

Elements 30–34 operate as follows. Element 30 is an up/down counter having the composite blanking signal coupled as an up/down control signal to its U/D control input terminal. The up/down counter 30 counts pulses of a clock signal Ck/12 having a frequency of, for example, one-third the frequency of a color subcarrier signal. Counter 30 provides count values between zero and thirty-one inclusive and is arranged so that it does not wrap around. That is, if the counter is counting up (down) and the number of clock pulses occurring before the counter is conditioned to count down (up) is in excess of the number necessary to condition the counter to provide its maximum (minimum) count value of 31(0), the counter will continue to output its maximum (minimum) count value of 31(0) for each clock pulse in excess. Counter 30 effectively operates as an integrator having an output which saturates in both the positive and negative going directions. The output of the up/down counter 30, which is a five bit signal, is coupled to one input of a comparator circuit 32. A reference value is coupled to a second input of the comparator circuit 32. Comparator circuit 32 provides a logic one signal only when the output count from the counter 30 exceeds the reference value. The output signal from the comparator 32 is applied to the data input terminal of a D-type latch 34 which is clocked by the clock signal Ck/12, and provides the signal Vm at its Q output terminal.

The reference value and the frequency of the clock signal applied to the counter 30 are selected so that the value output by the counter 30 will not exceed the reference value during horizontal blanking periods. Thus the Q output of latch 34 will exhibit a logic low value during occurrences of horizontal blanking pulses. In the illustrated embodiment of FIG. 1, the reference value is 11011 (binary) or 27 decimal, and is arranged to be dynamic to provide system hysteresis. Note that the most significant and third most significant bits of the reference signal applied to the B input terminal of the comparator 32 are respectively coupled to logic "1" and "0" values. The remaining bits of the reference value are coupled to the $\bar{Q}$ output of the latch 34. Assuming that comparator 32 has been producing low output values, the $\bar{Q}$ output of latch 34 will exhibit a logic high state and the reference value is 11011 (binary). After the output of comparator 32 goes high, the $\bar{Q}$ output of latch 34 exhibits a low value, changing the reference value of 10000 (binary) or 16 decimal. If there is some noise in the vertical blanking interval, causing the counter to oscillate between up and down counts, reducing the reference value precludes the output signal provided by the latch 34 from changing state prematurely.

The counter 30 counts up for high levels of composite blanking and counts down for low levels. Nominally the counter 30 will exhibit a zero value in approximately 12 $\mu$sec or less after termination of each horizontal blanking interval because the typical horizontal blanking pulse is 12 $\mu$sec wide and the counter will count down in a time equivalent to the horizontal blanking pulse width. Assuming that the counter 30 exhibits a zero value on the occurrence of a vertical blanking pulse, latch 34 will exhibit a high output state approximately 23.5 $\mu$sec (28 clock cycles each having a period of 840 ns) after the positive going transition of the vertical blanking interval. Alternatively, if the last horizontal blanking pulse before the occurrence of the vertical blanking interval is relatively close to the vertical blanking interval, the counter 30 may exhibit a value other than zero at the start of the vertical blanking interval. In this instance the leading edge of the signal Vm will be spaced less than 23.5 $\mu$sec from the leading edge of the vertical blanking interval. This however is of no consequence. The signal Vm goes low 12.6 $\mu$sec after the termination of the vertical blanking interval, i.e., the counter must count down from 31 to 16 (15 $\times$ 840 ns) for the comparator to change state. However, if the end of the vertical blanking interval is relatively close to the first subsequent blanking pulse, i.e., within a period corresponding to less than 15 cycles of the clock Ck/12, the signal Vm will remain high for a period of 15 cycles of the clock Ck/12 following the first subsequent horizontal blanking pulse. This may be seen with reference to FIGS. 2F and 2H. Note however that the trailing edge of the signal Vm may be conditioned to substantially conform to the end of the vertical blanking interval, if desired, by eliminating or reducing the amount of hysteresis applied to the reference value applied to the comparator 32.

Refer to elements 18–28 which generate the odd-/even field signal Fm. Elements 18–28 are arranged to develop a count value proportional to the time elapsed from the negative going transition of the signal Vm to the occurrence of the first subsequent pulse of the signal Hm in each field, and to compare the count value from successive fields. Because the interval between the negative going transition of the vertical blanking interval and the occurrence of the first subsequent horizontal blanking pulse differs by approximately one-half of one horizontal line interval in successive fields, the respective count values for odd and even fields will differ significantly. A comparison of the count value of the current field with the count value of the previous field will provide an indication of whether the current field is odd or even.

In FIG. 1 a 10-bit counter 20 counts pulses of the clock signal Ck. The count 20 is reset to zero by the signals Hm and Vm which are applied to a reset terminal via a logic OR circuit 18. (Note that the signal Hm need not be applied to the reset terminal of the counter 20 for the purpose of generating the signal Fm. However, if the signal Hm is applied to reset counter 20, then the output of counter 20 can serve as, e.g., a pixel address counter in a Pix-in-Pix system, during the non-vertical blanking intervals of each video field.) The counter 20 is maintained in the reset state for the interval that the signal Vm exhibits a high state and begins counting immediately following the negative going transition of the signal Vm. Count values provided by counter 20 are coupled to a D-type latch 22 which is conditioned by a control signal developed by element 28, to store the count value present on the occurrence of the first subsequent horizontal blanking pulse following the negative going transition of the signal Vm. The output of the D-type latch 22 is coupled to a further D-type latch 24 which is clocked simultaneously with the latch 22. Latches 22 and 24 contain the count values for the current and previous fields respectively. The count values stored in latches 22 and 24 are respectively coupled to the A and B input terminals of a comparing circuit 26. Comparing circuit 26 exhibits high and low output states for the count value applied to its input terminal A being greater and lesser respectively than the count value applied to its terminal B. With knowledge of the relative timing of the vertical blanking interval tot he first subsequent horizontal blanking pulse from field to field, the designer can designate whether the high or low output state exhibited by the comparing circuit 26 corresponds to an odd or an even field. The signal Fm is illustrated in FIG. 2E and 2K for two successive field periods.

Control signals for clocking the latches 22 and 24 are developed by a set-reset flip-flop 28 which is of the type wherein the set input signal has precedence over a concurrently applied reset signal. That is, as long as a logic high signal is applied to the set input terminal of the flip-flop, the flip-flop will remain in the set state regardless of the signal level applied to its reset input terminal.

The control signal is taken from the $\overline{Q}$ output terminal of flip-flop 28. Thus when the flip-flop is in the reset (set) state the control signal is a logic high (low) level. With respect to latches 22 and 24, the operative portions of the control signal are positive going transitions.

The signal Vm is applied to the set input terminal of flip-flop 28 and the signal Hm is applied to its reset terminal. The flip-flop is reset at the occurrence of the first horizontal blanking pulse subsequent the negative going transition of the signal Vm. Flip-flop 28 remains in the reset state and exhibits a logic high output state until the occurrence of the positive transition of the signal Vm, at which time it exhibits a logic low state. The flip-flop is constrained to remain in the set state for the duration that the signal Vm exhibits a high state. Thereafter on the occurrence of the next pulse of signal Hm it is reset. The control signal provided by flip-flop 28 is illustrated in FIGS. 2D and 2J for two successive fields.

If the signal Hm is applied to the reset input terminal of the counter 20, it may be necessary to delay the signal Hm applied to the OR circuit 18 relative to the signal Hm applied to the flip-flop 28 to insure that the count value provided by counter 20 is stored in latch 22 before the counter 20 is reset.

As shown in FIG. 1 and discussed herein the signal Fm is developed from a composite blanking signal with the aid of circuit elements 12-16 which provide a horizontal timing signal and elements 30-34 which provide a vertical timing signal related to horizontal and vertical blanking pulses respectively. However, if separate horizontal and vertical blanking signals ($H_{blank}$, $V_{blank}$) are available from standard blanking signal generators, they may be coupled directly to circuit elements 18 and 28 as indicated in phantom in FIG. 1. Alternatively, if horizontal synchronizing signals $H_{sync}$ and vertical synchronizing signals $V_{sync}$ are available from standard sync separators, they may be utilized to develop an odd/even field signal Fm by connecting these signals directly to elements 18 and 28 as indicated. The only constraints on these signals that are necessary for the elements 18-28 to develop a field indicating signal are that the time interval between $V_{blank}$ ($V_{sync}$) and the occurrence of the first subsequent $H_{blank}$ ($H_{sysc}$) pulse be relatively constant in respective odd and even fields and be different between successive fields.

What is claimed is:

1. In a video signal processing system for processing video signal having first and second alternating field types, said first and second field types including horizontal and vertical signal components and differing with respect to a timing relationship of their respective horizontal and vertical signal components, apparatus for generating a field type indicating signal comprising:
   means for providing a vertical signal corresponding to said vertical component;
   means for providing a horizontal signal corresponding to said horizontal component;
   means responsive to said vertical and horizontal signals for measuring an interval between a transition of said vertical signal and a predetermined transition of said horizontal signal, and providing a measurement value for each field; and
   means for comparing the measurement value from a field with the measurement value of the immediately preceding field of video signal to provide a field type indicating signal.

2. In a video signal processing system for processing video signal having first and second alternating field types, said first and second field types including horizontal and vertical signal components and differing with respect to a timing relationship of their respective horizontal and vertical signal components, apparatus for generating a field type indicating signal comprising:
   means for providing a vertical signal corresponding to said vertical component;
   means for providing a horizontal signal corresponding to said horizontal component;
   means for providing a clock signal;
   counting means having a reset input terminal coupled to receive said vertical signal, and an output terminal for providing count values, and responsive to said clock signal for counting cycles of said clock signal;
   a data latch having a data input terminal coupled to the output terminal o said counting means, and having a control terminal and an output terminal;
   control signal generating means having an output terminal coupled to said control terminal, and responsive to said vertical and horizontal signals for generating a control signal to condition said data latch to store count values at predetermined times, said count values corresponding to measurements of an interval between a transition of said vertical signal and a predetermined transition of said horizontal signal;
   means for comprising measurement values from successive fields of video signal to provide a field type indicating signal.

3. The apparatus set forth in claim 2 wherein said means for comparing measurement values comprises:
   a further data latch having an input terminal coupled to the output terminal of said data latch, having an output terminal, and having a control terminal coupled to the output terminal of said control signal generating means; and
   comparing means having first and second input terminals respectively coupled to the input and output terminals of said further data latch.

4. The apparatus set forth in claim 2 wherein said control signal generating means comprises a set/reset flip-flop having set and reset input terminals respectively coupled to receive said vertical and horizontal signals, and an output terminal coupled to the control terminals of said data latch and said further data latch.

5. The apparatus set forth in claim 2 wherein said means for providing a horizontal signal comprises a transition detector having an input terminal coupled to receive a composite blanking signal, and arranged to generate pulse on the occurrence of predetermined transitions of signal applied to its input terminal.

6. In a video signal processing system for processing video signal having first and second alternating field types, said first and second field types including horizontal and vertical signal components and differing with respect to a timing relationship of their respective horizontal and vertical signal components, apparatus for generating a field type indicating signal comprising:

means for providing a vertical signal corresponding to said vertical component including:

integrating means, having an input terminal for receiving a composite blanking signal, and having an output terminal for providing an integrated version of signal applied to its input terminal;

a comparator coupled to said integrating means for providing a signal exhibiting a first state when said integrated version exceeds a predetermined value, an exhibiting a second state otherwise; and a latch, having an output terminal for providing said vertical signal, and conditioned to store signal provided by said comparator at predetermined intervals;

means for providing a horizontal signal corresponding to said horizontal component;

means responsive to said vertical and horizontal signals for measuring an interval between a transition of said vertical signal and a predetermined transition of said horizontal signal, and providing a measurement value; and means for comparing measurement values from successive fields of video signal to provide a field type indicating signal.

7. The apparatus set forth in claim 6 wherein said integrating means comprises an up/down counter.

* * * * *